US011485323B2

(12) United States Patent
Ooji et al.

(10) Patent No.: US 11,485,323 B2
(45) Date of Patent: Nov. 1, 2022

(54) IMAGING APPARATUS FOR VEHICLE

(71) Applicants: Kojima Industries Corporation, Toyota (JP); Tokyo Cosmos Electric Co., Ltd., Zama (JP)

(72) Inventors: Kenichi Ooji, Toyota (JP); Hitoshi Shimada, Toyota (JP); Kazuya Shibata, Toyota (JP); Noritaka Terasawa, Zama (JP); Masashi Kaji, Zama (JP)

(73) Assignees: KOJIMA INDUSTRIES CORPORATION, Toyota (JP); TOKYO COSMOS ELECTRIC CO., LTD., Zama (JP)

( * ) Notice: Subject to any disclaimer, the term of this patent is extended or adjusted under 35 U.S.C. 154(b) by 449 days.

(21) Appl. No.: 16/212,927

(22) Filed: Dec. 7, 2018

(65) Prior Publication Data
US 2019/0176762 A1 Jun. 13, 2019

(30) Foreign Application Priority Data

Dec. 12, 2017 (JP) .............................. JP2017-238037

(51) Int. Cl.
*B60R 11/04* (2006.01)
*B60R 1/00* (2022.01)
(Continued)

(52) U.S. Cl.
CPC ............... *B60S 1/026* (2013.01); *B60R 11/04* (2013.01); *G03B 17/55* (2013.01); *H05B 3/06* (2013.01);
(Continued)

(58) Field of Classification Search
None
See application file for complete search history.

(56) References Cited

U.S. PATENT DOCUMENTS 7,731,373 B2 * 6/2010 Oskarsson ........ B32B 17/10385
359/512
8,907,250 B2 * 12/2014 Bressand ................ B60R 11/04
219/203
(Continued)

FOREIGN PATENT DOCUMENTS

CN 103340010 A 10/2013
CN 104160779 A 11/2014
(Continued)

OTHER PUBLICATIONS

Extended European Search Report corresponding to Application No. 18209959.8-1204; dated May 10, 2019.
(Continued)

*Primary Examiner* — Joseph M. Pelham
(74) *Attorney, Agent, or Firm* — Cantor Colburn LLP

(57) ABSTRACT

A heater includes a heat generation element which includes a heater wire which spreads in a planar manner, and a metal plate serving as a heat dissipation element which includes a material having a high thermal conductivity, which is placed on a vehicle windowpane side of the heat generation element, which is heated by heat from the heat generation element, and which irradiates heat to the vehicle windowpane side. The vehicle windowpane is heated by the heat irradiated from the metal plate serving as the heat dissipation element.

6 Claims, 7 Drawing Sheets

(51) Int. Cl.
*G03B 17/55* (2021.01)
*H05B 3/06* (2006.01)
*H05B 3/84* (2006.01)
*B60S 1/02* (2006.01)
*B60R 11/00* (2006.01)

(52) U.S. Cl.
CPC ........ *H05B 3/84* (2013.01); *B60R 2011/0026* (2013.01); *H05B 2203/003* (2013.01); *H05B 2203/008* (2013.01); *H05B 2203/013* (2013.01); *H05B 2203/016* (2013.01)

(56) References Cited

U.S. PATENT DOCUMENTS

| | | | |
|---|---|---|---|
| 9,913,319 B2* | 3/2018 | Timmermann | H05B 3/03 |
| 10,479,287 B2* | 11/2019 | Sliwa | B60S 1/0848 |
| 10,953,853 B2* | 3/2021 | Oikawa | B60R 11/04 |
| 2003/0059218 A1* | 3/2003 | Sakata | G03B 17/08 |
| | | | 396/429 |
| 2008/0284850 A1* | 11/2008 | Blaesing | H01Q 1/325 |
| | | | 348/148 |
| 2011/0233248 A1 | 9/2011 | Flemming et al. | |
| 2012/0103960 A1* | 5/2012 | Bressand | H05B 3/84 |
| | | | 219/203 |
| 2012/0107665 A1 | 5/2012 | Abe et al. | |
| 2012/0119104 A1* | 5/2012 | Arslan | B60R 11/04 |
| | | | 250/395 |
| 2013/0240251 A1 | 9/2013 | Kaplan et al. | |
| 2013/0314540 A1* | 11/2013 | Hacker | B60J 1/002 |
| | | | 348/148 |
| 2015/0034621 A1 | 2/2015 | Hmmermann et al. | |
| 2016/0119509 A1* | 4/2016 | Wato | G03B 17/55 |
| | | | 348/148 |
| 2017/0070651 A1 | 3/2017 | Hacker et al. | |
| 2017/0293199 A1* | 10/2017 | Kim | H04N 5/2252 |
| 2017/0295610 A1* | 10/2017 | Usami | H05B 3/84 |
| 2017/0334364 A1* | 11/2017 | Usami | B60R 11/04 |
| 2017/0334366 A1* | 11/2017 | Sliwa | B60R 11/04 |
| 2017/0334397 A1* | 11/2017 | Mueller | G01S 7/521 |
| 2018/0056942 A1* | 3/2018 | Oikawa | H05B 1/0236 |
| 2018/0160477 A1* | 6/2018 | Timmermann | H05B 3/03 |
| 2018/0242404 A1* | 8/2018 | Wehninck | B60R 11/04 |
| 2019/0193647 A1* | 6/2019 | Oikawa | H05B 3/84 |
| 2019/0193683 A1* | 6/2019 | Oikawa | B60S 1/0848 |
| 2019/0193684 A1* | 6/2019 | Oikawa | B60R 11/04 |
| 2019/0200416 A1* | 6/2019 | Shinkai | H05B 1/0236 |
| 2019/0208583 A1* | 7/2019 | Kasetani | B60S 1/026 |
| 2019/0375344 A1* | 12/2019 | Kobayashi | G03B 17/55 |
| 2020/0017037 A1* | 1/2020 | Masui | B60R 11/04 |
| 2020/0247330 A1* | 8/2020 | Tokunaga | G03B 17/55 |
| 2020/0275533 A1* | 8/2020 | Ochiai | G03B 17/55 |

FOREIGN PATENT DOCUMENTS

| | | | |
|---|---|---|---|
| CN | 105539310 A | | 5/2016 |
| CN | 107444343 A | | 12/2017 |
| CN | 107444351 A | | 12/2017 |
| DE | 102014006891 A1 | | 12/2014 |
| DE | 102014006924 A1 | | 12/2014 |
| EP | 3001674 A1 | | 3/2016 |
| EP | 3228508 A1 | | 10/2017 |
| JP | 61078465 A | | 4/1986 |
| JP | 2002045781 A | | 2/2002 |
| JP | 2002110322 A | | 4/2002 |
| JP | 2002341432 A | * | 11/2002 |
| JP | 2007121955 A | | 5/2007 |
| JP | 2012504518 A | | 2/2012 |
| JP | 2013533754 A | | 8/2013 |
| JP | 2017061317 A | | 3/2017 |
| JP | 2017147031 A | | 8/2017 |
| JP | 2017206098 A | | 11/2017 |
| WO | 2010037500 A2 | | 4/2010 |
| WO | 2011001691 A1 | | 6/2011 |

OTHER PUBLICATIONS

JPO Notice of Reasons for Refusal for corresponding JP Application No. 2017-238037; dated Jun. 8, 2021.
CNIPA First Office Action for corresonding CN Application No. 201811492983.X; dated Oct. 18, 2021.
JPO Notice of Reasons for Refusal for corresponding JP Application No. 2017-238037; dated Oct. 12, 2021.
CNIPA The Second Office Action for corresponding CN Application No. 201811492983.X; dated Apr. 24, 2022.
JPO Notice of Reasons for Refusal for corresponding JP Application No. 2017-238037; dated Apr. 26, 2022.

* cited by examiner

EMBODIMENT

EMBODIMENT

IMAGING APPARATUS FOR VEHICLE

CROSS REFERENCE TO RELATED APPLICATION

The present application claims priority under 35 U.S.C. § 119 to Japanese Patent Application No. 2017-238037 filed on Dec. 12, 2017 including the specification, claims, drawings, and abstract is incorporated herein by reference in its entirety.

TECHNICAL FIELD

The present disclosure relates to an imaging apparatus for a vehicle, which is equipped in a vehicle and which captures an image of a front of the vehicle or the like through a vehicle windowpane.

BACKGROUND

There are increasing cases where a vehicle is equipped with an imaging apparatus which captures an image of a front of the vehicle or the like. An image obtained by the imaging apparatus is used for, for example, guiding the travel, recording a travel status, preventing collision, automatic traveling, or the like.

The imaging apparatus is attached on a side of a vehicle cabin of a vehicle windowpane such as the windshield, for example. By placing the imaging apparatus in the vehicle cabin, the imaging apparatus can be prevented from being affected by rain, wind, or the like. However, there may be cases where the vehicle windowpane is fogged up by dew condensation, resulting in blocking of the front field of view of the imaging apparatus, and consequently, reduction of an imaging capability.

JP 2012-504518 A discloses that a heater for heating the vehicle windowpane is provided, and the vehicle window pane in front of the imaging apparatus is heated, to prevent dew condensation.

In this structure, it is desirable to heat the windowpane in front of the imaging apparatus as uniformly as possible. With such a configuration, energy consumption can be set relatively low, time for resolving the dew condensation can be shortened, and a size of the heater can be reduced.

SUMMARY

According to one aspect of the present disclosure, there is provided an imaging apparatus for a vehicle, comprising: a camera that is attached at a vehicle cabin inner side of a vehicle windowpane and that images an outside of the vehicle; and a heater that is placed to oppose, with a space therebetween, the vehicle windowpane positioned in front of a camera lens of the camera, and that radiates heat toward the vehicle windowpane, wherein the heater comprises: a heat generation element which includes a heating wire which spreads in a planar manner; and a heat dissipation element which includes a material having a high thermal conductivity, which is placed on the vehicle windowpane side of the heat generation element, which is heated by the heat from the heat generation element, and which radiates the heat to the windowpane side, and the vehicle windowpane is heated by the heat radiated from the heat dissipation element.

According to another aspect of the present disclosure, the heat dissipation element may be formed from a metal.

According to another aspect of the present disclosure, the heater may include a substrate, the heat generation element may be placed over a first surface of the substrate, and the heat dissipation element may be placed over a second surface of the substrate.

According to the present disclosure, the vehicle windowpane can be uniformly heated, and the capability for resolving fogging of the vehicle windowpane can be improved.

BRIEF DESCRIPTION OF DRAWINGS

Embodiment(s) of the present disclosure will be described by reference to the following figures, wherein.

DESCRIPTION OF EMBODIMENTS

Embodiments of the present disclosure will now be described with reference to the drawings. The present disclosure is not limited to the embodiments described herein.

[Overall Structure]

Figure 1:
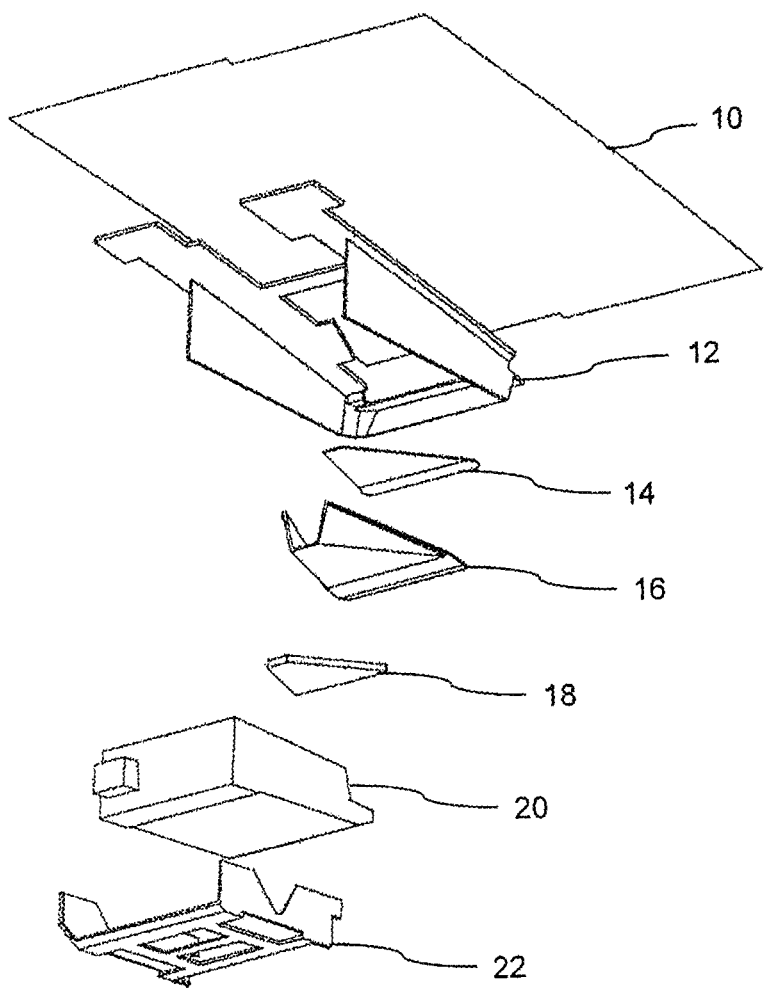
FIG. 1 is an exploded perspective diagram of an imaging apparatus according to an embodiment of the present disclosure.

FIG. 1 is an exploded perspective diagram showing an overall structure of an imaging apparatus for a vehicle according to an embodiment of the present disclosure. A vehicle windowpane 10 is, for example, a windshield of the vehicle. On a surface of the vehicle windowpane 10 on the side of a vehicle cabin, a bracket 12 is attached. When the bracket 12 is attached to the windshield, for example, the bracket 12 may be attached at a position which does not obstruct a field of view of a driver, for example, in a region near an upper end of the windshield.

The bracket 12 has a glass-side portion affixed on the windowpane 10, and a pair of side portions which extend from respective sides of the glass-side portion toward the vehicle cabin side, for holding a camera. The glass-side portion has an opening at a region corresponding to a field of view of the camera.

A camera 20 is held on the bracket 12, and a fixation member 22 is attached in a manner to cover the vehicle cabin side of the camera 20. That is, the camera 20 is held by the bracket 12 and the fixation member 22.

On a side portion in front of an imaging camera lens of the camera 20 (a portion opposing the vehicle windowpane 10), a heater 18 which spreads in a planar manner, a hood 16 which covers the heater 18, and a felt member 14 placed on the surface of the hood 16 are placed.

[Structure of the Camera 20]

Figure 2:
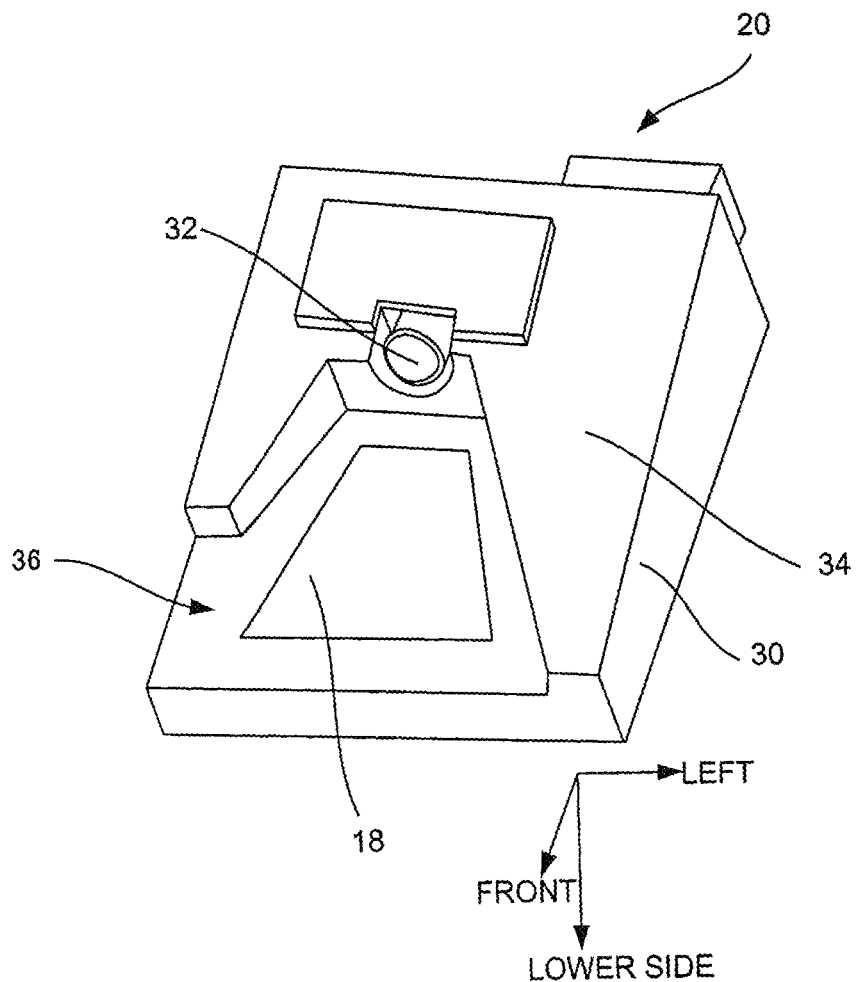
FIG. 2 is a perspective diagram of a camera.

FIG. 2 shows a structure of the camera 20. In FIG. 1, the camera 20 is viewed from the vehicle cabin side, but in FIG. 2, the camera 20 is viewed from the side of the vehicle windowpane 10. The camera 20 has a case 30 which has an approximate rectangular parallelepiped shape. On a front surface side of the case, a camera lens 32 is exposed. The camera lens 32 faces the front of the vehicle when the camera 20 is attached, and the camera 20 images the front of the vehicle through the vehicle windowpane 10.

At a lower front side of the case 30, a recess 36 recessed in a trapezoidal pillar shape spreading toward the front is formed. Thus, an upper surface 34 of the case 30 of the camera 20 has an approximate U shape with the lower front side opened, and is fixed to a gasket.

The heater 18 is placed on a bottom surface of the recess 36, and the hood 16 and the felt 14 are placed above the heater 18. In other words, the heater 18 is placed with spacing with respect to the vehicle windowpane 10. As shown in FIG. 1, the hood 16 has a U-shape cross section and a trapezoidal bottom part corresponding to the heater 18, and a pair of sidewalls thereof correspond to sidewalls of the recess 36. The felt member 14 is affixed to an upper surface of the bottom part of the hood 16 (on the side of the vehicle windowpane 10). The felt member 14 prevents incidence of scattered light into the camera lens 32 by diffusely reflecting or absorbing the light incident from the outside of the vehicle.

[Structure of the Heater 18]

Figure 3:
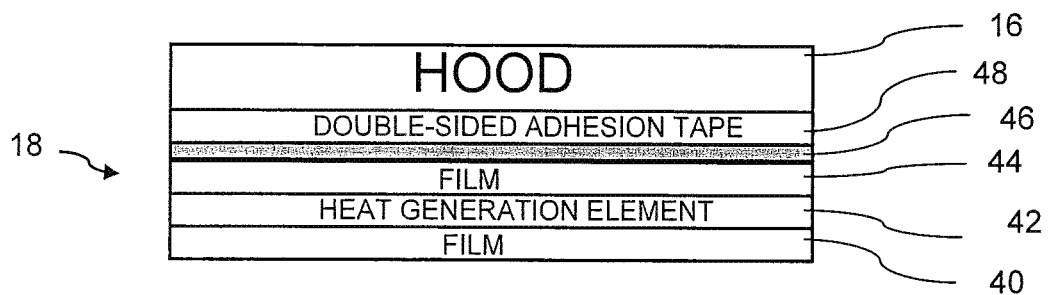
FIG. 3 is a cross-sectional diagram of a heater.
Figure 4:
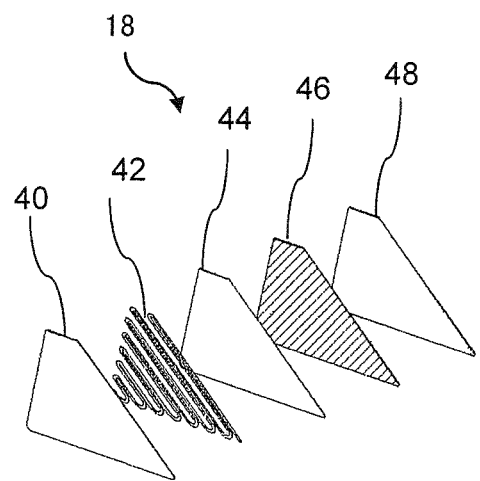
FIG. 4 is an exploded perspective diagram of a heater.

FIG. 3 is a cross-sectional diagram of the heater 18, and FIG. 4 is an exploded perspective diagram of the heater 18. As shown, the heater 18 has a structure in which a plurality of materials are layered. A film 40 serving as a substrate is formed from a heat enduring plastic such as, for example, PET (polyethylene terephthalate), polyimide, an epoxy resin, or the like. A heat generation element 42 is placed over the film 40. The heat generation element 42 is a wire pattern of a heating wire (for example, a Nichrome line), and generates heat by a current flowing therethrough. In this example configuration, the Nichrome line is placed in a meandering manner to form the pattern, and an overall shape of the pattern is set to a trapezoidal shape.

A film 44 serving as a protective substrate is placed over the heat generation element 42. With this configuration, the heat generation element 42 is sandwiched by the films 40 and 44. The film 44 may be formed from the same material as that of the film 40.

The heat generation element 42 may be formed over the film 40 by printing, etching, or the like. With the film 44, oxidation, adhesion of stain, damages, and the like of the heat generation element 42 are prevented.

As a heat dissipation element having a high thermal conductivity, a metal plate 46 is placed over the film 44. The metal may be any metal, but copper, aluminum, and the like are particularly suited. The hood 16 is placed over the metal plate 46 with a double-sided adhesion tape 48 therebetween. With this structure, the metal plate 46 is adhered to the hood 16. Alternatively, a layer of a material such as an epoxy resin may be placed in place of the metal plate 46, so long as the material has a high thermal conductivity. In addition, the metal plate 46 may cover the entirety of the heat generation element 42, or partially cover the heat generation element 42.

In this manner, the heater 18 is affixed to a back surface side (vehicle cabin side) of the hood 16 with the metal plate 46 therebetween. A range of the front field of view of the camera 20 is approximately equal to an area of the hood 16. Therefore, the fogging on the vehicle windowpane 10 can be removed by radiant heat from the metal plate 46.

Here, because a resistance value of the heat generation element 42 must be set to a predetermined value, a fine and long elongation of the element becomes necessary, resulting in locations of high and low densities. Because of this, unevenness is caused in a temperature distribution, which affects a temperature distribution on the surface of the hood 16. In the present embodiment, the heat generation element 42 having an uneven temperature distribution is not directly affixed to the hood 16, but rather, the metal plate 46 is placed between the hood 16 and the heat generation element 42. Therefore, the heat from the heat generation element 42 is not irradiated as is, but is used for heating the metal plate 46. Therefore, the hood 16 obtains the heat not from the heat generation element 42 having a pattern of high and low densities, but from the metal plate 46 in which the heat distribution/radiation intensity is made uniform. Because the metal plate 46 has a high thermal conductivity, a uniform temperature can be achieved for the entire metal plate 46. Specifically, the metal plate 46 is a one-sheet plate, does not have surface sections or length sections different from each other, and has a high thermal conductivity. Because of these, the metal plate 46 functions to set the same heat distribution/radiation intensity per unit area, and uniformly transfers the heat.

The radiant heat from the metal plate 46 is irradiated to the vehicle windowpane 10. Therefore, heating of the vehicle windowpane 10 by the uniform radiant heat from the metal plate 46 is enabled. In other words, the heat generation element 42 having the pattern of low and high densities has only an auxiliary function to heat the metal plate 46, and thus, even when there is an uneven density pattern in the heat generation element 42, a uniform radiant heat may be irradiated for the region of the vehicle windowpane 10 corresponding to the field of view of the camera 20 of the vehicle windowpane 10.

[Temperature Distribution]

Figure 5A:
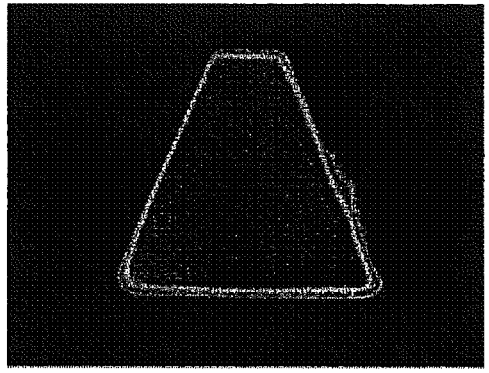
FIG. 5A is a thermography image of a heater according to an embodiment of the present disclosure.
Figure 5B:
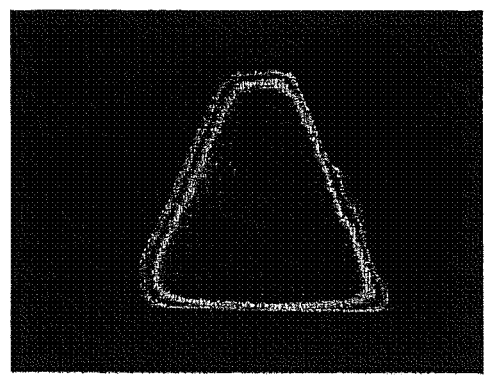
FIG. 5B is a thermography image of a heater of a Comparative Example.

FIG. 5A and FIG. 5B show example measurements of the temperature distribution (thermography images) in the heater 18 of the present embodiment (FIG. 5A) and in a Comparative Example in which the metal plate 46 is removed (FIG. 5B). As shown, in the present embodiment, the temperature is uniform over the entire region of the metal plate 46. On the other hand, in the Comparative Example, there is a significant temperature difference between a central portion and a peripheral portion.

[Alternative Configurations]

Figure 6A:
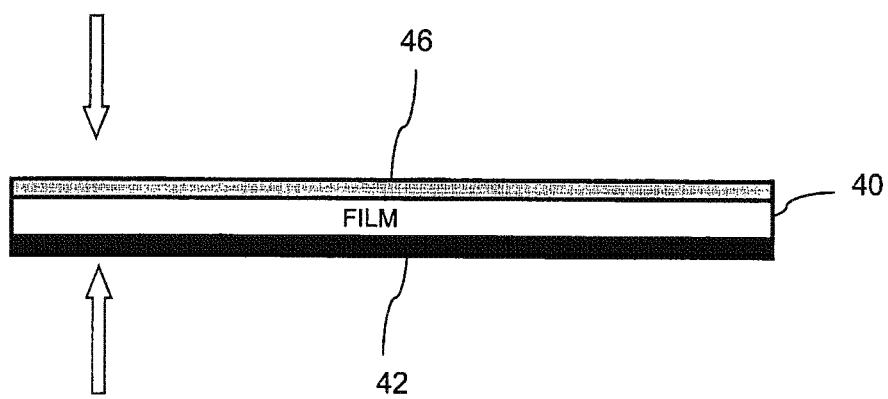
FIG. 6A is a diagram showing a cross-sectional structure of a heater according to another embodiment of the present disclosure.
Figure 6B:
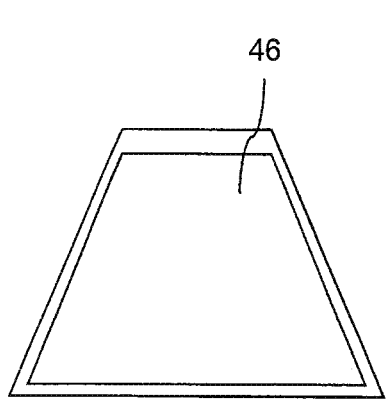
FIG. 6B is a diagram showing a structure in an A view of the heater of FIG. 6A.
Figure 6C:
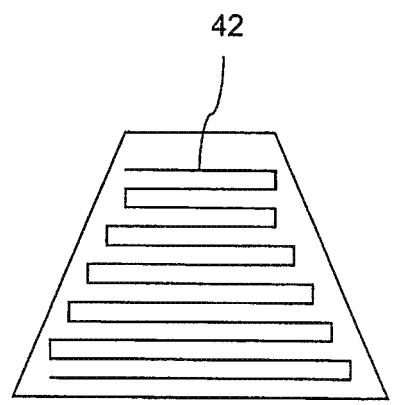
FIG. 6C is a diagram showing a structure in a B view of the heater of FIG. 6A.

FIG. 6A, FIG. 6B, and FIG. 6C are structural diagrams of an alternative configuration of a heater 18 of an imaging apparatus according to an embodiment of the present disclosure, in which the number of components is reduced. FIG. 6A shows a cross-sectional structure of the heater, FIG. 6B shows an A view (top view) of the heater of FIG. 6A, and FIG. 6C shows a B view (bottom view) of the heater of FIG. 6C.

In this example configuration, the metal plate 46 is formed over a first surface of the film 40 serving as the substrate of the heater 18, and the heat generation element 42 is formed over a second surface of the film 40. These elements are formed by forming a conductive film through sputtering or evaporation, and then etching both surfaces. Specifically, over the first surface, the patterned heat generation element 42 is formed, and, over the second surface, the metal plate 46 for uniform temperature distribution is formed as an entire-surface pattern which is not patterned. Desirably, the heat generation element 42 and the metal plate 46 are set slightly smaller than the film 40, to form a space at a peripheral portion, where there is no metal.

With such a structure, it is possible to reliably fix the metal plate 46 and the heat generation element 42 to the film 40. In particular, the thicknesses of the metal plate 46 and the heat generation element 42 may be set to the thickness of the etching thin film, which results in reduction of the thickness, improvement in the thermal conductivity, and more uniform heat distribution. Further, it is not necessary to adhere the metal plate 46 and the heat generation element 42 to the film 40, and, for example, an adhesion member such as the double-sided adhesion tape becomes unnecessary. Thus, an advantage can be obtained in that the number of components can be reduced.

Figure 7:
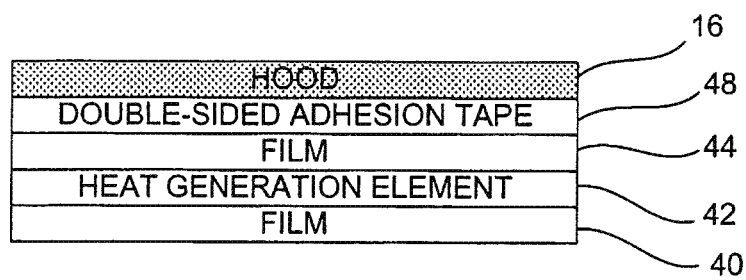
FIG. 7 is a diagram showing a structure of a heater according to another embodiment of the present disclosure.

FIG. 7 shows another embodiment of the present disclosure. In this example configuration, the metal plate 46 is omitted, but the hood 16 is formed from a metal (a material having a high thermal conductivity). Therefore, the hood 16 functions as the heat dissipation element for achieving uniform heat distribution, similar to the metal plate 46.

Figure 8:
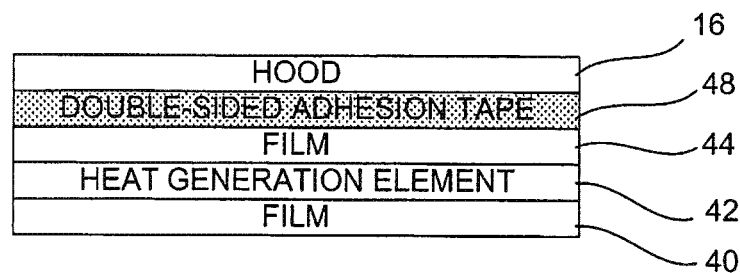
FIG. 8 is a diagram showing a structure of a heater according to another embodiment of the present disclosure.

FIG. 8 shows another embodiment of the present disclosure. In this example configuration, the metal plate 46 is omitted, but the double-sided adhesion tape 48 is formed from a material having a high thermal conductivity. Adhesion members may be placed on both surfaces of the metal film, or adhesion members may be placed on both surfaces of a plastic having a high thermal conductivity. Therefore, the double-sided adhesion tape 48 functions as the heat dissipation element for achieving uniform heat distribution, similar to the metal plate 46.

Figure 9A:
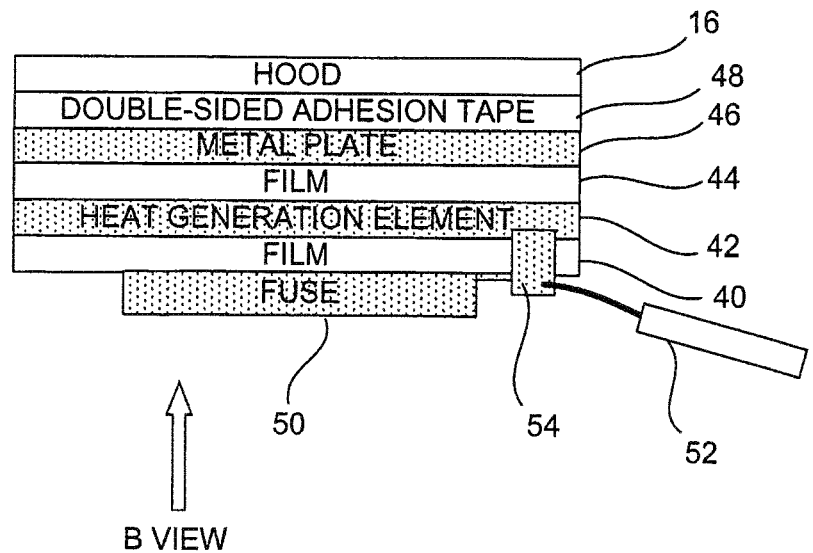
FIG. 9A is a diagram showing a cross-sectional structure of a heater according to another embodiment of the present disclosure.
Figure 9B:
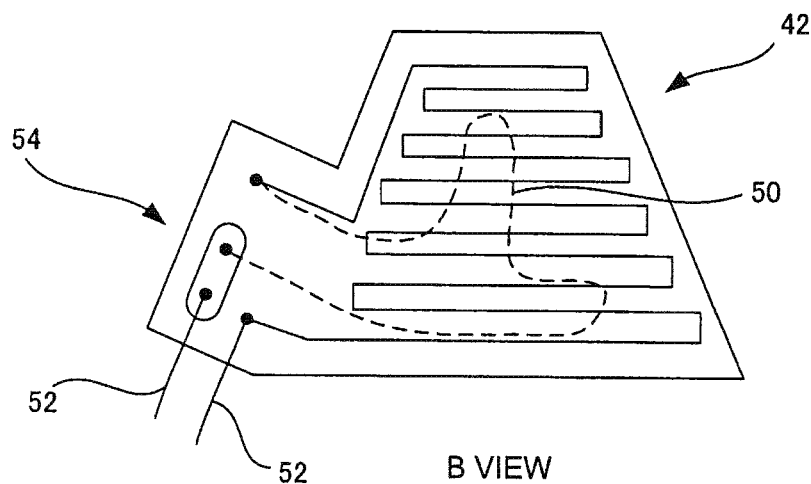
FIG. 9B is a diagram showing a structure in a B view of the heater of FIG. 9A.

FIG. 9A and FIG. 9B show another embodiment of the present disclosure. FIG. 9A shows a cross-sectional structure, and FIG. 9B shows a B view (bottom view) of the heater of FIG. 9A. In this example configuration, a fuse 50 is placed on a second surface of the film 40 over a first surface of which the heat generation element 42 is formed. The fuse 50 is a member which melts and ruptures when the temperature of the heat generation element 42 becomes greater than or equal to a predetermined temperature, and the melted and ruptured portion and the wiring thereof are placed at locations relatively close to the heat generation element 42, where the heat from the heat generation element 42 is transferred. In addition, the fuse 50 and the heat generation element 42 are connected in series with respect to an external wiring 52 connected to a power supply, and a current from the power supply flows in the fuse 50 and the heat generation element 42. In the example configuration shown in the figures, one of the external wirings 52 is connected to one end of the heat generation element 42 at a terminal portion 54 at a side of the heat generation element 42. In addition, the other end of the heat generation element 42 is connected to one end of the fuse 50 at the terminal portion 54, and the other end of the fuse 50 is connected to the other of the external wirings 52 at the terminal portion 54. The connections between the conductors at the terminal portion 54 may be achieved by caulking.

In such a structure, because the heat from the heat generation element 42 is absorbed by the fuse 50 and the wiring therefor, these portions tend to have a lower temperature than the surroundings. Therefore, these portions become obstructions for uniform heating. However, in the present embodiment, the metal plate 46 is present between the heat generation element 42 and the vehicle windowpane 10. Therefore, the metal plate 46 may be set to a uniform temperature, and the vehicle windowpane 10 can be uniformly heated.

The invention claimed is:

1. An imaging apparatus for a vehicle, comprising:
   a camera that is attached at a vehicle cabin inner side of a vehicle windowpane and that images an outside of the vehicle;
   a heater that is placed to oppose, with a space therebetween, the vehicle windowpane positioned in front of a camera lens of the camera, and that irradiates heat toward the vehicle windowpane; and
   a hood placed between the heater and the vehicle windowpane and directly covering the heater, wherein
   the heater comprises:
      a heat generation element which includes a heating wire which spreads in a planar manner;
      a heat dissipation element which includes a material having a high thermal conductivity, which is placed on the vehicle windowpane side of the heat generation element, which is heated by the heat from the heat generation element, and which irradiates the heat to the vehicle windowpane side; and
      a double-sided adhesion tape disposed between the heat dissipation element and the hood and adhering the heat dissipation element and the hood to each other, and
   the vehicle windowpane is heated by the heat irradiated from the heat dissipation element.

2. The imaging apparatus for the vehicle according to claim 1, wherein
   the heat dissipation element is formed from a metal.

3. The imaging apparatus for the vehicle according to claim 1, wherein
   the heater includes a substrate, and
   the heat generation element is placed over a first surface of the substrate, and the heat dissipation element is placed over a second surface of the substrate.

4. The imaging apparatus for the vehicle according to claim 2, wherein
   the heater includes a substrate, and
   the heat generation element is placed over a first surface of the substrate, and the heat dissipation element is placed over a second surface of the substrate.

5. The imaging apparatus for the vehicle according to claim 1, wherein a felt member is affixed to an upper surface of the hood.

6. An imaging apparatus for a vehicle, comprising:
   a camera that is attached at a vehicle cabin inner side of a vehicle windowpane and that images an outside of the vehicle;
   a heater that is placed to oppose, with a space therebetween, the vehicle windowpane positioned in front of a camera lens of the camera, and that irradiates heat toward the vehicle windowpane; and
   a hood placed between the heater and the vehicle windowpane and directly covering the heater, wherein
   the heater comprises:
      a heat generation element which includes a heating wire which spreads in a planar manner; and
      a heat dissipation element which includes a material having a high thermal conductivity, which is placed on the vehicle windowpane side of the heat generation element, which is heated by the heat from the heat generation element, and which irradiates the heat to the vehicle windowpane side, the vehicle windowpane is heated by the heat irradiated from the heat dissipation element, and a terminal portion for electrical connection to an external wire is disposed at a side of the heat generating element and an end portion of the heating wire extends to the side of the heat generating element and connects to the external wire at the terminal portion.

* * * * *